United States Patent [19]

Sasaki et al.

[11] Patent Number: 5,158,787
[45] Date of Patent: Oct. 27, 1992

[54] PROCESS FOR THE PRODUCTION OF HYDROGEN CYANIDE

[75] Inventors: Yutaka Sasaki; Hiroshi Utsumi; Masato Otani, all of Kanagawa, Japan

[73] Assignee: Nitto Chemical Industry Co., Ltd., Tokyo, Japan

[21] Appl. No.: 331,980

[22] Filed: Apr. 3, 1989

[30] Foreign Application Priority Data

Apr. 5, 1988 [JP] Japan .................. 63-82360

[51] Int. Cl.$^5$ .............................. C01C 3/02
[52] U.S. Cl. ................................. 423/376
[58] Field of Search ......................... 423/376

[56] References Cited

U.S. PATENT DOCUMENTS

| | | |
|---|---|---|
| 4,461,752 | 7/1984 | Sasaki et al. |
| 4,511,548 | 4/1985 | Attig et al. |
| 4,709,070 | 11/1987 | Sasaki et al. ............ 423/376 |
| 4,709,071 | 11/1987 | Sasaki et al. ............ 423/376 |
| 4,774,352 | 9/1988 | Sasaki et al. ............ 423/376 |

FOREIGN PATENT DOCUMENTS

| | | |
|---|---|---|
| 0089118 | 9/1983 | European Pat. Off. |
| 0153077 | 8/1985 | European Pat. Off. |
| 0323129 | 7/1989 | European Pat. Off. |
| 1811062 | 7/1969 | Fed. Rep. of Germany |
| 54-39839 | 11/1979 | Japan |

OTHER PUBLICATIONS

Patent Abstracts of Japan, vol. 8, No. 260(C-254) [1697], p. 152 C 254, Nov. 29, 1984–Abstract of JP-A-59-139938.

Primary Examiner—Wayne Langel
Attorney, Agent, or Firm—Sughrue, Mion, Zinn, Macpeak & Seas

[57] ABSTRACT

An iron-antimony oxide catalyst for use in the production of hydrogen cyanide by the vapor phase catalytic ammoxidation of methanol, and a process for the production of hydrogen cyanide in the presence of said improved catalyst are disclosed. This improved iron-antimony oxide catalyst is represented by the following formula:

$$Fe_a Cu_b Sb_c V_d Mo_e W_f P_g Q_h R_i S_j O_k (SiO_2)_l$$

wherein
Q is at least one element selected from the group consisting of Mg, Zn, La, Ce, Al, Cr, Mn, Co, Ni, Bi, U and Sn;
R is at least one element selected from the group consisting of B and Te;
S is at least one element selected from the group consisting of Li, Na, K, Rb, Cs, Ca and Ba; and
a, b, c, d, e, f, g, h, i, j, k and l each represents the atomic ratio of the elements in the formula for which they are subscript wherein
for a=10,
b=0.5–5,
c=12–30,
d=0–3,
e=0–15,
f=0–3,
g=1–30,
h=0–6,
i=0–5,
j=0–3,
k=the number of oxygen atoms as determined corresponding to the oxide formed by combining the above-described elements, and
l=25–200,
and wherein c/g is more than 1.5 and iron antimony oxide is present as a crystalline phase.

13 Claims, No Drawings

PROCESS FOR THE PRODUCTION OF HYDROGEN CYANIDE

FIELD OF THE INVENTION

The present invention relates to a process for the production of hydrogen cyanide by vapor phase catalytic ammoxidation of methanol.

BACKGROUND OF THE INVENTION

Hydrogen cyanide has been produced by decomposition of formamide ammoxidation of methane, and so forth. In recent years, the major portion of hydrogen cyanide commercially used has been supplied as a by-product obtained in the production of acrylonitrile by ammoxidation of propylene. However, with substantial improvements in catalysts for the production of acrylonitrile by ammoxidation of propylene, the amount of hydrogen cyanide by-produced has decreased, and it has sometimes become difficult to ensure an adequate supply of hydrogen cyanide for the production of methacrylate by an acetone cyanhydrin process.

Transportation of hydrogen cyanide is difficult and dangerous because of its toxicity. It is, therefore, advisable that hydrogen cyanide be used in a process where it is consumed immediately after it is produced.

The present invention provides a process which can be advantageously employed, for example, in those cases where:

(1) The change of catalyst and so forth in the existing equipment of production of acrylonitrile makes it difficult to ensure supply of hydrogen cyanide to the attached acetone cyanhydrin equipment;

(2) The equipment of production of methacrylate is constructed independently from the acrylonitrile production equipment; and (3) It is planned to produce hydrogen cyanide which is to be fed to equipment by production of various hydrogen cyanide derivatives.

Various techniques are known for the production of hydrogen cyanide from methanol, including a method where a vanadium/tin oxide catalyst is used (Russian Patent No. 106,226) a method where a tin/antimony oxide catalyst is used (British Patent No. 913,836), a method in which a molybdenum oxide catalyst is used (British Patent No. 718,112 and U.S. Pat. No. 2,746,843), a method in which a catalyst comprising molybdenum oxide and other various elements is used (U.S. Pat. No. 3,911,089), a method in which an oxide catalyst comprising antimony, and iron, cobalt, nickel, manganese, zinc, uranium, or the like is used (JP-B-54-39839 and U.S. Pat. No. 4,461,752) (The term "JP-B" as used herein means an "examined Japanese patent publication"), a method in which a phosphate of manganese, iron, cobalt, nickel, zinc, boron or uranium is used as a catalyst (European Patent Publication No. 121032A), a method in which an oxide catalyst containing manganese or phosphorus is used (U.S. Pat. No. 4,457,905), a method in which an oxide catalyst containing iron, copper and antimony is used (JP-A-58-145617, JP-B-63-16330 and U.S. Pat. No. 4,461,752) (The term "JP-A" as used herein means an "unexamined published Japanese patent application"), and a method in which antimony phosphate is used (U.S. Pat. No. 4,511,548).

These prior art methods, however, are disadvantageous industrially because of the high molar ratio of ammonia to methanol in the feed gas, the use of a large amount of steam, low methanol concentration, and low physical properties of catalysts as typified by marked time-dependent change and poor catalyst strength. Of the known catalysts described above, the Fe-, Cu- and Sb-containing oxide catalyst shown in JP-A-58-145617, JP-B-63-166330 and U.S. Pat. No. 4,461,752 are preferred because of the various advantages it has, but it is still unsatisfactory in terms of activity to a concentrated methanol feed.

SUMMARY OF THE INVENTION

The present invention overcomes the disadvantages of catalysts proposed in JP-B-54-39839 and U.S. Pat. No. 4,461,752.

The present invention provides to a process for the production of hydrogen cyanide by the vapor phase catalytic ammoxidation of methanol, comprising by using a catalyst represented by the formula:

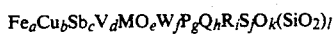

$$Fe_aCu_bSb_cV_dMo_eW_fP_gQ_hR_iS_jO_k(SiO_2)_l$$

Wherein

Q is at least one element selected from the group consisting of Mg, Zn, La Ce, Al, Cr, Mn, Co, Ni, Bi, U and Sn;

R is at least one element selected from the group consisting of B and Te;

S is at least one element selected from the group consisting of Li, Na, K, Rb, Cs, Ca and Ba; and a, b, c, d, e, f, g, h, i, j, k and l each represents the atomic ratio of the elements in the formula for which they are subscripts where for $a=10$,
$b=0.5-5$ (preferably 1-4),
$c=12-30$ (preferably 13-28),
$d=0-3$ (preferably 0.05-2),
$e=0-15$ (preferably 0.1-5),
$f=0-3$ (preferably up to 1),
$g=1-30$ (preferably 5-20),
$h=0-6$ (preferably up to 3),
$i=0-5$ (preferably up to 3),
$j=0-3$ (preferably up to 2),
$k=$ the number of oxygen atoms as determined corresponding to the oxide formed by combining the above-described elements, and
$l=25-200$ (preferably 30-100), and wherein c/g is more than 1.5 and iron antimony oxide is present as a crystalline phase.

DETAILED DESCRIPTION OF THE INVENTION

In recent years, the use of methanol as a fuel has been studied. As methanol becomes less expensive, the process of the invention is particularly advantageous.

Hydrogen cyanide produced by the process of the invention contains reduced amounts of by-products and impurities compared with that produced by ammoxidation of hydrocarbons such as propylene, isobutene, toluene, and xylene. In some case, therefore, it can be used as such without any special purification. In accordance with the process of the invention, in addition to hydrogen cyanide as a main product, only small amounts of carbon monoxide and carbon dioxide gas are produced.

The process of this invention has advantages over the conventionally widely used process of ammoxidation of methane because the conversion of the feed is high, the catalyst is inexpensive, the reaction temperature is low, the disposal of waste gas is easy because nitrogen oxides are substantially not produced, and the construction cost can be reduced.

The present invention has been accomplished by eliminating the defects of the prior art described above, and it particularly provides an improvement in the catalysts described in JP-B-54-39839 and U.S. Pat. No. 4,461,752.

A principal object of the present invention is to provide a catalyst for use in the production of hydrogen cyanide by ammoxidation of methanol that is capable of attaining high product yield with a minimum decrease in the catalytic activity even if the feed gas has a high methanol concentration and where the physical properties of the catalyst are significantly improved. In an effort to attain this object, the present inventors conducted intensive research on the catalysts as described in U.S. Pat. No. 4,461,752 and found that by incorporating a specified amount of phosphorus as an additional catalyst component in the Fe-, Cu- and Sb-containing catalyst, the performance of this catalyst was improved to such an extent that its activity and physical properties were sufficient to make it suitable for use in the presence of highly concentrations of methanol. The present invention has been accomplished on the basis of this finding.

The process of the present invention for producing hydrogen cyanide by ammoxidation of methanol comprises using an iron-antimony oxide catalyst represented by the following empirical formula:

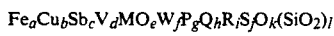

$$Fe_aCu_bSb_cV_dMo_eW_fP_gQ_hR_iS_jO_k(SiO_2)_l$$

wherein

Q is at least one element selected from the group consisting of Mg, Zn, La, Ce, Al, Cr, Mn, Co, Ni, Bi, U and Sn;

R is at least one element selected from the group consisting of B and Te;

S is at least one element selected from the group consisting of Li, Na, K, Rb, Cs, Ca and Ba; and a, b, c, d, e, f, g, h, i, j, k and each represents the atomic ratio of the elements in the formula for which they are subscripts wherein for a=10, b=0.5-5 (preferably 1-4), c=12-30 (preferably 13-28), d=0-3 (preferably 0.05-2), e=0-15 (preferably 0.1 5), f=0-3 (preferably up to 1), g=1-30 (preferably 5-20), h=0-6 (preferably up to 3), i=0-5 (preferably up to 3), j=0-3 (preferably up to 2), k=the number of oxygen atoms as determined corresponding to the oxide formed by combining the above-described elements, and l=25-200 (preferably 30-100), and wherein c/g is more than 1.5 and iron antimony oxide is present as a crystalline phase.

Oxide catalysts comprising antimony and copper alone accelerate the combustion of methanol, producing almost no hydrogen cyanide. Unexpectedly, on the other hand, it has been found that oxide catalysts comprising specific proportions of antimony, iron, and copper are entirely free from the above-described problems resulting from the use of the copper component, and, in contrast, produce high yields of hydrogen cyanide. The addition of copper prevents the formation of small sticks (projected materials) on the surface of the catalyst which occurs easily in the case of a high antimony content, and its addition is effective for increasing the strength of the catalyst.

The catalyst of the present invention includes phosphorus as an additional component in the known oxide catalyst containing iron, copper and antimony as essential components, and, as will be demonstrated in the examples to be given later in this specification, the activity and physical properties of this catalyst are so much improved that a particularly high yield of hydrogen cyanide is attained even under reaction conditions where the feed gas has a high methanol concentration.

The catalyst used in the process of the present invention is based on iron, copper, antimony and phosphorus and, in a particularly preferred embodiment, has an atomic ratio of Sb/P greater than 1.5, with its crystallographic structure being that of an Fe-Sb oxide compound (FeSbO$_4$).

If the phosphorus component in the catalyst is too large, the reaction rate is reduced and hence the amount of catalyst used must be increased to attain the desired conversion of methanol. Further, the hydrogen cyanide yield is reduced.

In the case where the phosphorus component is too large, various disadvantages will also occur in terms of its physical properties, for example, when it is used as a fluidized bed catalyst, the reduction of bulk density or catalyst strength occurs and the fluidized bed state tends to be deteriorated due to an increase of adhesiveness of catalysts.

Thus, various advantages such as the reduced hydrogen cyanide yield and the increase of loss of the catalyst components will occur, and it is not economically suitably for practical use. In the production of catalysts in the such case, the slurry is unstable, and when the slurry is left as it is, the properties of the slurry tend to be changed. According to circumstances, the gelification thereof will be cansed. Accordingly, it is also unsatisfactory in terms of reproducibility.

The addition of vanadium, molybdenum or tungsten is effective in enhancing the reaction rate and resistance to reductive deterioration. The addition of vanadium alone or in combination with molybdenum is particularly preferred.

In addition, as optional components, magnesium, zinc, lanthanum, cerium, aluminum, chromium, manganese, cobalt, nickel, bismuth, uranium, tin, etc., can be added. Addition of these elements makes it possible to control the reaction rate, the physical properties of the catalyst, and so forth.

In order to control the reaction rate and the amount of by-products formed, various elements may be added such as boron, tellurium, lithium, sodium, potassium, rubidium, cesium, calcium and barium.

The silica component is desirably used to provide catalysts with the necessary strength. Particularly, in the case of catalysts for use in a fluidized bed, the addition of the silica component is essential for providing preferred physical properties (particle density and strength).

It is not completely clear in what way the individual components of the catalyst are bonded together, but as stated hereinabove, it has been established that the catalyst of the present invention contains a complex oxide of iron and antimony. While not disclosing to be bound it is postulated that other catalyst components are present in various complex forms of chemical bonding The catalyst of the present invention may be prepared by any known method as described, for example, in U.S. Pat. Nos. 3,657,155, 3,686,138, 4,049,575, 4,107,085, 4,590,175 and 3,341,471, and U.S. patent application Ser. Nos. 276,586 (filed on Nov. 28, 1988) and 290,326 (filed on Dec. 27, 1988). For instance, in order to prepare a catalyst for use in a fixed bed, powders of the starting materials are compacted under pressure and calcined or the necessary starting materials are mixed to form a slurry, which is then dried, molded and calcined. In order to prepare a catalyst for use in a fluidized bed, a common process comprises making a slurry by mixing the necessary starting materials, optionally performing pH adjustment and heat treatment on the slurry, and thereafter spray-drying the slurry to form fine particles which are then calcined.

Suitable starting materials for the production of catalysts of the invention include various compounds containing each of these catalyst components, such as oxides, hydroxides, chlorides and nitrates.

Compounds which can be used as starting materials for the iron and copper components include the oxides, hydroxides, nitrates, and chlorides of iron or copper. It is preferable to use their nitrates, and solutions of the electrolytic iron and electrolytic copper dissolved in nitric acid are appropriate.

Suitable starting materials for the antimony components, are for example, antimony trioxide, antimony tetroxide, and antimony pentoxide. In addition, compounds produced by the reaction of metallic antimony with nitric acid may be used.

Water-soluble or water-isoluble molybdenum compounds can be used as starting materials for the molybdenum component. Examples include molybdenum trioxide, molybdic acid, ammonium paramolybdate, ammonium metamolybdate, and molybdenum halides.

In connection with the vanadium and tungsten components, water-soluble or water-insoluble compounds can be used as described for the molybdenum component.

Convenient materials for the phosphorus component include phosphorus pentoxide, orthophosphoric acid, ammonium dihydrogen-phosphate, diammonium hydrogen-phosphate, and triammonium phosphate.

Suitable starting materials for the other components include their nitrates In addition, their chlorides and oxides, for example, can be used.

Silica sol is a convenient silica material but a fine silica powder and silica hydrogel may also be used.

Catalysts as used herein can be prepared by the above mentioned techniques, such as a mixing method, a precipitating method, and an impregnating method. For example, in the case of catalysts for use in a fluidized bed, the necessary starting materials selected from above-described starting materials for the catalyst components are mixed, and if necessary, are subjected to pH adjustment, heat-treatment, etc. Thereafter, the resulting slurry is spray-dried to form finely divided particles. The thus-formed particles are calcined at a temperature of from 200° C. to 600° C. and finally at a temperature of from 500° C. to 950° C. for from 0.5 to 50 hours to prepare the desired catalyst. The particle sizes of these catalysts are preferably within the range of from 5 to 300 microns, with the range of from 10 to 200 microns being more preferred.

It is particularly recommended that the catalyst of the present invention be prepared by the methods described in U.S. patent application Ser. Nos. 276,586 (filed on Nov. 28, 1988) and 290,326 (filed on Dec. 27, 1988) which disclosures are incorporated herein by reference.

The reaction involved in the process of the present invention may be carried out in either a fixed bed or a fluidized bed.

The methanol feed as used in the process of this invention may be pure methanol or crude methanol containing impurities. Industrial ammonia can be used as the ammonia feed, if desired.

As the oxygen source, air is preferably used from an economic standpoint. This air may be diluted with an inert gas, such as nitrogen, and steam, or may also be enriched with oxygen. The addition of steam tends to prevent the formation of carbon monoxide or carbon dioxide, and in some cases, therefore, provides preferred results. The feed gas may be diluted with reaction off-gas (a mixed gas comprising nitrogen, carbon dioxide, carbon monoxide, etc.), if desired.

The molar ratio of oxygen to methanol in the feed gas is from 0.5:1 to 15:1 and preferably from 1:1 to 10:1. The molar ratio of ammonia to methanol in the feed gas is from 0.5:1 to 3:1 and preferably from 0.7:1 to 2.5:1.

It is preferred that the reaction temperature is from 350° C. to 500° C., preferably 380° C. to 480° C., the contact time is from 0.5 to 20 seconds, and the reaction pressure is from atmospheric pressure to about 2 kg/cm$^2$G.

In ammoxidation of methanol by the process of the present invention, the reaction may be performed in the presence of both methanol and various other organic compounds so as to produce hydrogen cyanide alone or both hydrogen cyanide and nitriles. For example, propylene, isobutene or tertiary butanol may be supplied together with methanol as described, for example, in U.S. Pat. Nos. 3,716,496 and 3,988,359, JP B-61-44857 and JP-B-61-44858. If propylene is supplied as a concomitant feed, both hydrogen cyanide and acrylonitrile are produced. If isobutene or tertiary butanol are supplied as a concomitant feed, both hydrogen cyanide and methacrylonitrile are produced. Formaldehyde, dimethyl ether, methyl tertiarybutanol, etc. can be also supplied for co-ammoxidation.

By using the metal oxide catalyst of the present invention which contains iron, copper, antimony and phosphorus as essential components, hydrogen cyanide can be produced in high yield from a mixture of methanol, oxygen and ammonia. Furthermore, a high yield of hydrogen cyanide, for example, more than 80%, can be maintained even if the reaction is continued for several months.

Phosphorus-containing catalysts have the disadvantage that the yield of the end product is sometimes reduced after prolonged reaction due to the loss of the phosphorus component from the catalyst. However, this problem is absent from the catalyst of the present invention and it was demonstrated experimentally that this catalyst produced a consistently high yield of hydrogen cyanide even when it was used in the reaction for an extended period.

If the selectively for hydrogen cyanide is found to decrease after the reaction has been performed for an extremely long period or on account of improperly selected reaction conditions, the catalyst activity can be maintained or even improved by supplying an additional amount of the phosphorus component during the reaction.

The present invention is hereinafter described in greater detail by reference to the following Examples and Comparative Examples.

In these examples, the terms "Yield of Hydrogen Cyanide (%)" and "Unreacted Methanol (%)" are defined as follows.

Yield of Hydrogen Cyanide (%) =

$$\frac{\text{Weight Amount of Carbon in Hydrogen Cyanide Formed}}{\text{Weight Amount of Carbon in Methanol Supplied}} \times 100$$

Unreacted Methanol (%) =

$$\frac{\text{Amount of Residual Methanol (moles)}}{\text{Amount of Methanol Supplied (moles)}} \times 100$$

Catalytic Activity Testing Method

A fluid bed type reactor with a catalyst fluidized portion of an inside diameter of 2.5 cm and a height of 40 cm was packed with a catalyst under test and gaseous mixture of methanol, ammonia and air was supplied thereto.

Test Condition I

The molar ratios of the gases supplied to the reactor were as follows:
Oxygen/Methanol = 1.6 (mol/mol)
$NH_3$/Methanol = 1.1 (mol/mol)

The concentration of methanol in the feed gas was 10.3 vol % and the feed gas also contained nitrogen in addition to methanol, ammonia and oxygen.

Test Condition II

The molar ratios of the gas supplied to the reactor were as follows:
Oxygen/Methanol = 4.3 (mol/mol)
$NH_3$/Methanol = 1.1 (mol/mol)

The concentration of methanol in the feed gas was 4.4 vol % and the feed gas also contained nitrogen besides methanol, ammonia and oxygen.

The apparent contact time is defined as follows:

Apparent Contact Time (sec) =

$$\frac{\text{Volume of Catalyst Based on Apparent Bulk Density (liter)}}{\text{Flow Rate of Gas Feed Calculated under Reaction Conditions (liter/sec)}} \times 100$$

Attrition Resistance Test

The method described in "Test Methods for Synthetic Cracking Catalysts" (American Cynamid Co., Ltd. 6/31-4m-1/57), which is a collection of accepted testing methods for catalysts used in fluid catalytic cracking, was used. The Attrition Loss (5) was determined by the following formula:

$$\text{Attrition Loss (\%) } R = \frac{B}{C - A} \times 100$$

wherein

A = the weight (g) of the catalyst portion that wore away in a period of 0 to 5 hrs;
B = the weight (g) of the catalyst portion that wore away in a period of 5 to 20 hrs;
C = the weight (g) of the catalyst tested.

For the purpose of the experimental testing, C was selected at 50. The higher the attrition resistance, the smaller the R value (%) the catalyst had.

Preparation of Catalysts and Evaluation Thereof

Example 1

A fluidized bed catalyst having the empirical formula $Fe_{10}Cu_3Sb_{22}Mo_{0.2}P_5O_{75.1}(SiO_2)_{60}$ was prepared by the following procedures:

(I) 286.7 g of an antimony trioxide powder was provided;

(II) 49.9 g of an electrolytic iron powder was slowly added to a heated mixture of 385 ml of nitric acid (specific gravity, 1.38) and 480 ml of water until it dissolved completely; to the solution, 79.3 g of copper nitrate was added and dissolved;

(III) 1,612 g of silica sol ($SiO_2$ concentration, 20 wt %) was mixed with 51.5 g of 85% phosphoric acid under sufficient stirring to form a uniform mixture; and (IV) 3.2 g of ammonium paramolybdate was dissolved in 50 ml of water.

With thorough stirring, the mixture obtained in (III) was added to the solution prepared in (II), followed by the addition of the solutions prepared in (I) and (IV). The resulting slurry was heated at 100° C for 1 hrs with sufficient stirring.

The heated slurry was spray-dried by a standard method with a rotary disk type spray-dryer. The so obtained fine spherical particles were calcined at 250° C. for 8 hrs, then at 400° C. for 5 hrs, and finally calcined at 800° C. for 5 hrs in a fluidized bed firing furnace.

Example 2

A fluidized bed catalyst having the empirical formula $Fe_{10}Cu_2Sb_{25}V_{0.5}P_{15}O_{105.75}(SiO_2)_{60}$ was prepared as in Example 1 except that ammonium metavanadate was used in place of ammonium paramolybdate and that the conditions of the final step of calcination in the catalyst preparation were 730° C.×4 hrs.

Example 3

A fluid bed catalyst having the empirical formula $Fe_{10}Cu_3Sb_{22}V_{0.2}Mo_{0.7}P_7La_{0.5}Ce_{0.5}O_{83.85}(SiO_2)_{30}$ was prepared as in Example 1 except that ammonium metavanadate, lanthanum nitrate and ammonium cerium nitrate were respectively used as the starting materials for V, La and Ce components, which were added to the slurry prior to heating. The conditions of the final step of calcination in the catalyst preparation were 760° C.×4 hrs.

Example 4

A fluid bed catalyst having the empirical formula $Fe_{10}Cu_2Sb_{13}Mo_1P_8Mg_{1.5}K_{0.1}O_{67.55}(SiO_2)_{60}$ was prepared as in Example 1 except that magnesium nitrate and potassium nitrate were respectively used as the starting materials for the Mg and K components, which were added to the slurry prior to heating. The conditions of the final step of calcination in the catalyst preparation were 820° C.×3 hrs.

Example 5

A fluid bed catalyst having the empirical formula $Fe_{10}Cu_1Sb_{20}V_{0.1}Mo_{0.5}W_{0.1}P_{10}Zn_2O_{85.05}(SiO_2)_{60}$ was prepared as in Example 1 except that ammonium metavanadate, ammonium paratungstate and zinc nitrate were respectively used as the starting materials for the V, W and Zn components, which were added to the slurry prior to heating. The conditions of the final step of calcination in the catalyst preparation were 780° C.×5 hrs.

Example 6

A fluid bed catalyst having the empirical formula $Fe_{10}Cu_2Sb_{23}V_{0.2}Mo_{0.7}P_{15}O_{103.1}(SiO_2)_{60}$ was prepared as in Example 1 except that ammonium metavanadate was used as the starting material for the V component, which was added to the slurry prior to heating. The conditions of the final step of calcination in the catalyst preparation were 810° C.×4 hrs.

Example 7

A fluid bed catalyst having the empirical formula $Fe_{10}Cu_2Sb_{28}Mo_{0.5}P_{18}Co_{0.5}Ni_{0.5}Te_{1.2}O_{122.9}(SiO_2)_{60}$ was prepared as in Example 1 except that cobalt nitrate, nickel nitrate and telluric acid were respectively used as the starting materials for the Co, Ni and Te components, which were added to the slurry prior to heating. The conditions of the final step of calcination in the catalyst preparation were 780° C.×4 hrs.

Example 8

A fluid bed catalyst having the empirical formula $Fe_{10}Cu_2Sb_{20}V_{0.1}Mo_{4.5}P_3O_{78.25}(SiO_2)_{60}$ was prepared as in Example 1 except that ammonium metavanadate was used as the starting material for the V component, which was added to the slurry prior to heating. The conditions of the final step of calcination in the catalyst preparation were 700° C.×3 hrs.

Example 9

A fluid bed catalyst having the empirical formula $Fe_{10}Cu_4Sb_{15}Mo_{0.3}W_{0.2}P_8Al_{0.5}Sn_{0.5}B_3Ca_{0.5}O_{77.25}(SiO_2)_{80}$ was prepared as in Example 1 except that ammonium paratungstate, aluminum nitrate, a tin dioxide powder, orthoboric acid and calcium nitrate were respectively used as the starting materials for the W, Al, Sn, B and Ca components, which were added to the slurry prior to heating. The conditions of the final step of calcination in the catalyst preparation were 840° C.×3 hrs.

Example 10

A fluid bed catalyst having the empirical formula $Fe_{10}Cu_2Sb_{28}V_{0.2}Mo_{0.4}W_{0.1}P_9Bi_1B_{0.5}O_{99.75}(SiO_2)_{60}$ was prepared as in Example 1 except that ammonium metavanadate, ammonium paratungstate, bismuth nitrate and orthoboric acid were respectively used as the starting materials for the V, W, Bi and B components, which were added to the slurry prior to heating. The conditions of the final step of calcination in the catalyst preparation were 710° C.×3 hrs.

Comparative Example 1

A fluid bed catalyst having the empirical formula $Fe_{10}Cu_3Sb_{22}Mo_{0.2}O_{62.6}(SiO_2)_{60}$ was prepared as in Example 1 except that phosphoric acid was not added.

Comparative Example 2

A fluid bed catalyst having the empirical formula $Fe_{10}Cu_3Sb_{22}V_{0.2}Mo_{0.7}La_{0.5}Ce_{0.5}O_{66.35}(SiO_2)_{30}$ was prepared as in Example 1 except that ammonium metavanadate, lanthanum nitrate and ammonium cerium nitrate were respectively added as the starting materials for the V, La and Ce components, which were added to the slurry prior to heating. Phosphoric acid was not added. The conditions of the final step of calcination in the catalyst preparation were 760° C.×4 hrs.

Comparative Example 3

A fluid bed catalyst having the empirical formula $Fe_{10}Cu_2Sb_{28}Mo_{0.5}Co_{0.5}Ni_{0.5}Te_{1.2}O_{77.9}(SiO_2)_{60}$ was prepared as in Example 1 except that cobalt nitrate, nickel nitrate and telluric acid were respectively used as the starting materials for the Co, Ni and Te components, which were added to the slurry prior to heating. Phosphoric acid was not added. The conditions of the final step of calcination in the catalyst preparation were 780° C.×4 hrs.

The catalysts prepared in Examples 1 to 10 and Comparative Examples 1 to 3 were subjected to an activity testing under Test Condition I set forth hereinabove.

The results are shown in Table 1 below.

TABLE 1

| Example No. | Catalytic Composition (atm. ratio) | | | | | | | | | | | Final Calcination Temperature (°C.) | Reaction Conditions (Test Condition I) | | Catalytic Activity | |
|---|---|---|---|---|---|---|---|---|---|---|---|---|---|---|---|---|
| | Fe | Cu | Sb | V | Mo | W | P | Q | R | S | Si | | Temp. (°C.) | Contact Time (sec) | Yield of Hydrogen Cyanide (%) | Conversion of Methanol (%) |
| Example 1 | 10 | 3 | 22 | — | 0.2 | — | 5 | — | — | — | 60 | 800 | 450 | 2.0 | 86.3 | 99.1 |
| Example 2 | 10 | 2 | 25 | 0.5 | — | — | 15 | — | — | — | 60 | 730 | 440 | 3.0 | 88.9 | 98.3 |
| Example 3 | 10 | 3 | 22 | 0.2 | 0.7 | — | 7 | La Ce 0.5 0.5 | — | — | 30 | 760 | 440 | 2.5 | 87.7 | 100.0 |
| Example 4 | 10 | 2 | 13 | — | 1 | — | 8 | Mg 1.5 | — | K 0.1 | 60 | 820 | 450 | 2.5 | 87.5 | 100.0 |
| Example 5 | 10 | 1 | 20 | 0.1 | 0.5 | 0.1 | 10 | Zn 2 | — | — | 60 | 780 | 430 | 3.0 | 89.0 | 98.7 |
| Example 6 | 10 | 2 | 23 | 0.2 | 0.7 | — | 15 | — | — | — | 60 | 810 | 450 | 2.5 | 87.2 | 99.9 |
| Example 7 | 10 | 2 | 28 | — | 0.5 | — | 18 | Co Ni 0.5 0.5 | Te 1.2 | — | 60 | 780 | 440 | 2.5 | 87.8 | 99.8 |
| Example 8 | 10 | 2 | 20 | 0.1 | 4.5 | — | 3 | — | — | — | 60 | 700 | 430 | 2.5 | 85.9 | 98.8 |
| Example 9 | 10 | 4 | 15 | — | 0.3 | 0.2 | 8 | Al Sn 0.5 0.5 | B Ca 3 0.5 | — | 80 | 840 | 450 | 2.0 | 88.2 | 99.5 |
| Example 10 | 10 | 2 | 28 | 0.2 | 0.4 | 0.1 | 9 | Bi 1 | B 0.5 | — | 60 | 710 | 450 | 2.5 | 87.6 | 97.8 |
| Comp. | 10 | 3 | 22 | — | 0.2 | — | — | — | — | — | 60 | 800 | 450 | 2.0 | 81.4 | 100.0 |

TABLE 1-continued

| Example No. | Catalytic Composition (atm. ratio) | | | | | | | | | | | Final Calcination Temperature (°C.) | Reaction Conditions (Test Condition I) | | Catalytic Activity | |
|---|---|---|---|---|---|---|---|---|---|---|---|---|---|---|---|---|
| | Fe | Cu | Sb | V | Mo | W | P | Q | R | S | Si | | Temp. (°C.) | Contact Time (sec) | Yield of Hydrogen Cyanide (%) | Conversion of Methanol (%) |
| Comp. Example 2 | 10 | 3 | 22 | 0.2 | 0.7 | — | — | La Ce 0.5 0.5 | — | — | 30 | 760 | 440 | 2.5 | 80.4 | 99.5 |
| Comp. Example 3 | 10 | 2 | 28 | — | 0.5 | — | — | Co Ni 0.5 0.5 | Te 1.2 | — | 60 | 780 | 440 | 2.5 | 81.9 | 99.9 |

Comparative Example 4

A fluid bed catalyst having the empirical formula $Fe_{10}Cu_2Sb_{25}Mo_{0.5}O_{81.0}(SiO_2)_{60}$ was prepared as in Example 1 except that phosphoric acid was not added. The conditions of the final step of calcination in the catalyst preparation were 850° C.×5 hrs.

Example 11

A fluid bed catalyst having the empirical formula $Fe_{10}Cu_2Sb_{25}Mo_{0.5}P_{10}O_{106.0}(SiO_2)_{60}$ was prepared as in Example 1 except that the conditions of the final step of calcination in the catalyst preparation were 850° C.×5 hrs.

The catalysts prepared in Comparative Example 4 and Example 11 were subjected to activity testing (under both Test Conditions I and II) and to strength testing.

The results are shown in Table 2 below.

TABLE 2

| Example No. | Catalytic Composition (atm. ratio) | | | | | | Final Calcination Temperature (°C.) | Reaction Conditions | | Catalyst Activity | | | | Catalyst Strength R Value (%) |
|---|---|---|---|---|---|---|---|---|---|---|---|---|---|---|
| | | | | | | | | | | Test Condition I* | | Test Condition II* | | |
| | Fe | Cu | Sb | Mo | P | Si | | Temp. (°C.) | Contact Time (sec) | Yield of Hydrogen Cyanide (%) | Conversion of Methanol (%) | Yield of Hydrogen Cyanide (%) | Conversion of Methanol (%) | |
| Comp. Example 4 | 10 | 2 | 25 | 0.5 | — | 60 | 850 | 450 | 1.0 | 93.2 | 100 | 82.6 | 96.9 | 3.6 |
| Example 11 | 10 | 2 | 25 | 0.5 | 10 | 60 | 850 | 450 | 1.0 | 93.5 | 100 | 90.1 | 98.2 | 0.4 |

*Methanol concentration at 4.4 vol %
**Methanol concentration at 10.3 vol %

While the invention has been described in detail and with reference to specific embodiments thereof, it will be apparent to one skilled in the art that various changes and modifications can be made therein without departing from the spirit and scope thereof.

What is claimed is:

1. A process for the production of hydrogen cyanide by vapor phase catalytic ammoxidation of methanol at temperatures in the range of 350° C. to 500° C., comprising performing said ammoxidation reaction in the presence of a catalyst represented by the following empirical formula:

$Fe_aCu_bSb_cV_dMo_eW_fP_gQ_hR_iS_jO_k(SiO_2)_l$ wherein
Q is at least one element selected from the group consisting of Mg, Zn, La, Ce, Al, Cr, Mn, Co, Ni, Bi, U and Sn;
R is at least one element selected from the group consisting of B and Te;
S is at least one element selected from the group consisting of Li, Na, K, Rb, Cs, Ca and Ba; and
a, b, c, d, e, f, g, h, i, j, k and each represents the atomic ratio of the elements in the formula for which they are subscripts wherein
for a=10,
b=0.5-5,
c=12-30,
d=0-3,
e=0-15,
f=0-3,
g=1-30,
h=0-6,
i=0-5,
j=0-3,
k=the number of oxygen atoms as determined corresponding to the oxide formed by combining the above-described elements, and
l=25-200,
and wherein c/g is more than 1.5 and iron antimony oxide is present as a crystalline phase.

2. The process as claimed in claim 1, wherein the process comprises performing the ammoxidation reaction in a fluidized bed reactor.

3. The process as claimed in claim 1, wherein the catalyst is a fluidized bed catalyst, and the particle size of the catalyst ranges between 5 and 300 microns.

4. The process as claimed in claim 1, wherein the concentration of methanol in the feed gas is from 1 to 20% by volume, the molar ratio of oxygen to methanol in the feed gas is from 0.5:1 to 15:1, and the molar ratio of ammonia to methanol in the feed gas is from 0.5:1 to 3:1.

5. The process as claimed in claim 1, wherein the process comprises performing the reaction at a temperature of from 350° C. to 500° C., a pressure of from atmospheric pressure to 2 kg/cm²G, and a contact time of from 0.5 to 20 seconds.

6. The process as claimed in claim 3, wherein the catalyst has a particle size within the range of from 10 to 200 microns.

7. The process as claimed in claim 1, wherein the molar ratio of oxygen to methanol fed to the reaction is from 0.5:1 to 15:1.

8. The process as claimed in claim 7, wherein the molar ratio of oxygen to methanol is 1:1 to 10:1.

9. The process as claimed in claim 1, wherein the molar ratio of ammonia to methanol in the gas fed to the reaction is from 0.5:1 to 3:1.

10. The process as claimed in claim 9, wherein the molar ratio of ammonia to methanol is from 0.7:1 to 2.5:1.

11. The process as claimed in claim 1, wherein the reaction temperature is in the range of 350° C. to 480° C.

12. The process as claimed in claim 1, wherein the activity of the catalyst is maintained or improved by adding a phosphorus component during the reaction.

13. The process as claimed in claim 1, wherein the reaction is performed in the presence of both the catalyst and an organic compound other than methanol.

* * * * *